March 30, 1943.        A. A. GASSNER        2,315,324
MULTIPLE-PLY STRUCTURE AND METHOD OF MAKING THE SAME
Filed Jan. 21, 1941
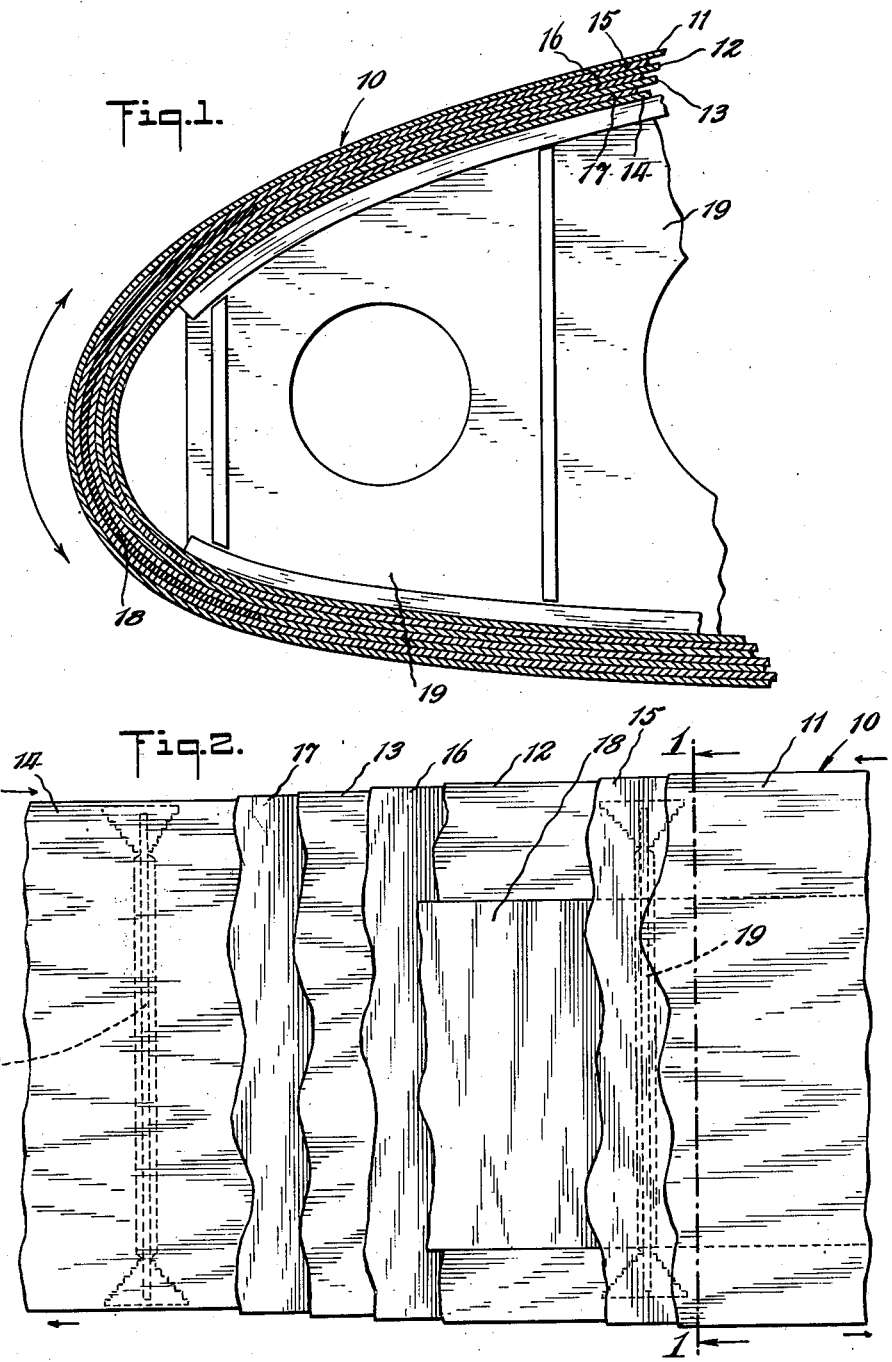
INVENTOR
ALFRED A. GASSNER
BY
ATTORNEYS Patented Mar. 30, 1943

2,315,324

UNITED STATES PATENT OFFICE 2,315,324

MULTIPLE-PLY STRUCTURE AND METHOD OF MAKING THE SAME

Alfred A. Gassner, New York, N. Y., assignor to John F. Neary, Jr., Englewood, N. J., as trustee Application January 21, 1941, Serial No. 375,199

3 Claims. (Cl. 244—123)

This invention relates to hollow multiple-ply structures, and methods of making the same, and has particular reference to increasing the strength of aeroplane wings and the like, although the invention is not limited to that use.

Inasmuch as the modulus of elasticity of wood lengthwise of the grain is considerably in excess of that across the grain, plywood structures subject to loads are customarily constructed with successive layers or plies arranged with their grains at an angle, usually at approximately right angles, so that for two nearly equal groups of plies so arranged at right angles, the modulus of elasticity of the multiple-ply structure is nearly the same at directions normal to each other. In order to increase the longitudinal strength of a multiple-ply structure in one direction, additional plies are often added with their grains running in that direction, or most of the usual number of plies were arranged in this fashion. This expedient has been tried in constructing multiple-ply wings, by arranging the majority of the plies with their gains running longitudinally or spanwise of the wing, but while this arrangement increased the longitudinal strength of the wing at some points, such as along the upper and lower wing panels, that was not so around the nose of the wing where the strain is most severe, and where even added longitudinal plies did not materially strengthen the wing at this point. This is due to the fact that longitudinal loads both in tension and compression, or mixed tension and compression as in twisting, along the elements of a multiple-ply curved structure are necessarily accompanied by flexing of the structure transversely, since the material, being inelastic, must flex transversely before it can flex longitudinally in response to the load. Inasmuch as the modulus of elasticity of wood across the grain, chordwise of the wing in the illustrative case, is low compared to that along the grain spanwise of the wing, i. e., low transverse or "hoop-strength" around the curved structure, the chordwise flexing to accommodate the spanwise flexing under heavy loads results in failure first across the grain, chordwise of the wing. Hence the addition of plies with their grains running longitudinally or spanwise, or arranging more of the usual plies in that fashion, does not increase the strength of the wing at the nose and, in fact, may decrease it.

In accordance with this invention, the characteristic of wood or other material having a greater modulus of elasticity in one direction than approximately at right angles thereto, is utilized in a multiple-ply curved structure to greatly increase its strength in longitudinal tension and compression, by so arranging the plies that the transverse or hoop-strength is materially increased to a point where transverse failure under heavy longitudinal loads is greatly retarded, to the end that the entire structure is stronger with little or no increase in its weight. This is of particular advantage in multiple-ply aeroplane wing structures and by way of illustration but not limitation, the invention will be described as applied to the nose or leading edge of a plywood wing.

The invention comprises substituting for one or more of the plies whose grains extend generally longitudinally of the curved leading edge or nose of a multiple-ply wing structure, one or more plies arranged in the lamina with their grains running generally transversely of the wing around the leading edge or nose thereof, or adding one or more plies with their grains running generally transversely of the wing around the leading edge or nose thereof, or both.

It will be seen that with this arrangement the transverse or hoop-strength of the curved leading edge of the wing is materially increased, whereby the strength of the wing is considerably augmented with little or no increase in the weight thereof and without requiring internal spars, struts, or other bracing of the curved nose to preclude failure under abnormal loads. The term "wing" used herein is equally applicable to ailerons, flaps, elevators, rudders and the like, and the invention is applicable to any curved multiple-ply structures having the characteristics of plywood and subject to loads along the elements of the curved surface.

For a more complete understanding of the invention, reference may be had to the accompanying drawing, in which:

Figure 1 is a transverse or chordwise section through the nose or leading edge of a multiple-ply aeroplane wing embodying the present invention, as seen along the line 1—1 of Fig. 2; and Fig. 2 is a front view of the nose of the wing with the several plies broken away and exposed to show the direction of the grains thereof.

Referring to Fig. 1 of the drawing, the aeroplane wing 10, of which only the nose portion is shown, is built up of a series of plies of wood, seven in this case, although it will be understood that any desirable number may be employed. Usually, and here also, subject to the exception to be mentioned, the nose shell of the wing 10 is built up of very thin wooden plies so arranged that in the seven-ply wing shown, the grains of the first, third, fifth and seventh plies, numbered 11, 12, 13 and 14, respectively, are arranged longitudinally or spanwise of the wing, and the remaining plies, namely, the second, fourth and sixth plies, numbered 15, 16 and 17, respectively, are arranged with their grains running transversely or chordwise of the wing. These plies, after being properly arranged with thermo-setting adhesive interposed between adjacent plies are shaped to conform to the contour of the mold, and are submitted to heat and pressure in the mold so that the adhesive softens, and when hardened, bonds the plies together in a substantially homogeneous self-sustaining structure of the prescribed contour. For further details of the arrangement of the mold and the manner of forming it, reference may be had to copending application Serial No. 398,896 filed April 29, 1941.

In the arrangement of this invention, the same procedure for the majority of plies is carried out, except that the third ply, 12, whose grain runs spanwise of the wing, is interrupted around the nose of the wing, and there is inserted in this space a substitute ply 18, which has its grain running transversely or chordwise of the wing around the nose in the same or substantially the same direction as the adjacent plies 15 and 16, notwithstanding the fact that the remainder of the third ply 12 has its grain running lengthwise or spanwise of the wing, as shown in Fig. 2. Accordingly, for the seven-ply wing shown, the nose portion thereof has four plies, 15, 16, 17 and 18, with their grains running chordwise or transversely of the wing, and the remaining three plies 11, 13 and 14 with their grains running longitudinally or spanwise of the wing. However, behind the curved nose portion, the upper and lower surfaces or panels of the wing comprise alternate plies with their grains running in the same direction and the remaining plies with their grains running in a direction at substantially right angles thereto.

In completing the construction of the multiple-ply wing 10 described, transverse or chordwise webs or stringers 19 are inserted and bonded in place at spaced intervals, such as 15 to 18 inches apart, for example, in the manner described in said application, so that the wing is stiffened in a vertical direction at those points, precluding major flexing thereof under load, such as spanwise compression in the upper panel of the wing, and spanwise tension in the lower panel of the wing, as indicated by the arrows in Fig. 2, or mixed tension and compression, as in twisting. However, these spaced webs or stringers 19 do not support the wing interiorly along its entire spanwise length, and to do so by means of additional webs or stringers, is impractical, both for structural reasons and because the multiplication of the chordwise stringers or webs would greatly increase the weight of the wing. Hence, there is a practical limit to the number of chordwise webs or stringers 19, and thus that portion of the wing between the adjacent stringers or webs 19 is substantially unsupported and subject to flexure under loads greater than those which the curved surface column of hollow section between adjacent stringers 19 can readily sustain by itself.

In ordinary wing multiple-ply wing structure not made in accordance with the invention, a flexing thereof, such as an outward bow longitudinally at the nose, must be accompanied by a corresponding depression behind the leading edge, since the material is inelastic. However, a column of a length between adjacent chordwise stringers or webs 19 of, say fifteen to eighteen inches, is relatively rigid, so that such flexing would result in initial failure in the direction of weakness. This would be transversely around the nose portion in the direction of the arrows in Fig. 1, since the transverse modulus of elasticity of the longitudinal grain plies 11, 12, 16 and 17, assuming that ply 12 extends around the nose, as usual, is low as compared to that along the grains of these plies. The insertion or substitution of the ply 18 with its grain running around the curvature of the nose transversely of the wing, greatly strengthens the nose portion transversely, i. e., increases the hoop strength thereof, because of the greater modulus of elasticity of wood lengthwise of the grain. Conversely, because greater transverse strength is required around the nose, the elimination from this area of a portion of the spanwise grain ply 12 does not decrease the strength of the nose of the wing longitudinally, as might be expected, nor would the addition of longitudinal grain plies materially increase its strength because the modulus of elasticity of the multiple-ply structure chordwise is not materially increased.

Accordingly, in the simple manner of this invention, the wing is greatly strengthened without any increase in weight, but it is to be understood that instead of substituting a portion of a normal ply with the section 18 running lengthwise of the wing, one or more additional transverse grain plies may be inserted between the normal plies, these additional plies having the characteristic of ply 18. Likewise, although a seven-ply wing is shown with one substitute or additional longitudinal ply 18, the invention is equally applicable to wings having more or less plies at the nose and with more than one additional or substitute transverse grain ply, such as 18, included therein.

Although the invention has been described in connection with multiple-ply wood veneer wings, it is equally applicable to other aforementioned aircraft parts, and to structures having curved surfaces in which the load is applied along the element of the curve, such as longitudinally or spanwise of the wing in the illustrative case, as indicated by the arrows in Fig. 2. Also, although wood has been mentioned in the illustrative case, any other material having the strength characteristic of wood of different moduli of elasticity in directions normal to each other in a common plane, may be employed with equal or substantially equal facility, and included in such materials would be synthetic plastics and other materials of fibrous structure; woven fabrics of natural or artificial textile fibres, wire or mixtures thereof; artificial sheets or plies formed of cords, cables, or wires, running substantially in one direction and imbedded in an initially plastic binder or body, and the like.

I claim:

1. In a multiple-ply structure having a curved portion and having its plies composed of material having substantially parallel fibres imparting greater strength to each ply in the direction of said fibres than normal thereto, said plies being arranged alternately in said structure with their fibres extending at angles to each other, the combination of an auxiliary ply included within said structure and extending around said curved portion thereof and having its fibres extending substantially in the direction of said curvature, said auxiliary ply being in face to face engagement with a ply having its fibers extending substantially in the direction of curvature for increasing the strength of said structure to withstand loads applied thereto in a direction substantially normal to the direction of curvature of said curved portion.

2. In a multiple-ply structure having a curved portion and having its plies composed of material having substantially parallel fibres imparting greater strength to each ply in the direction of said fibres than normal thereto, certain of said plies being arranged in said structure with their fibres extending normal to the direction of curvature of said portion and the remaining plies with their fibres extending substantially in the direction of said curvature, one of said certain plies being interrupted at the curved portion, the combination of a substitute ply in the interrupted portion of said one ply with its grain extending in the direction of curvature of said portion for increasing the strength of said structure to withstand loads normal to said direction.

3. In an aeroplane wing or the like, having a multiple-ply curved nose portion with certain of the plies arranged with their grains extending spanwise and other plies arranged with their grains extending chordwise of the wing, at least one of said spanwise grain plies being interrupted for the chordwise length of the curve of said nose portion, the combination of a corresponding ply inserted in the interrupted portion of said one ply with its grain extending around the curve of the nose in a chordwise direction for increasing the strength of the wing at that point.

ALFRED A. GASSNER.